June 20, 1933.  E. M. LOFLAND  1,914,952
PRODUCTION OF WHITE LEAD
Filed March 8, 1930
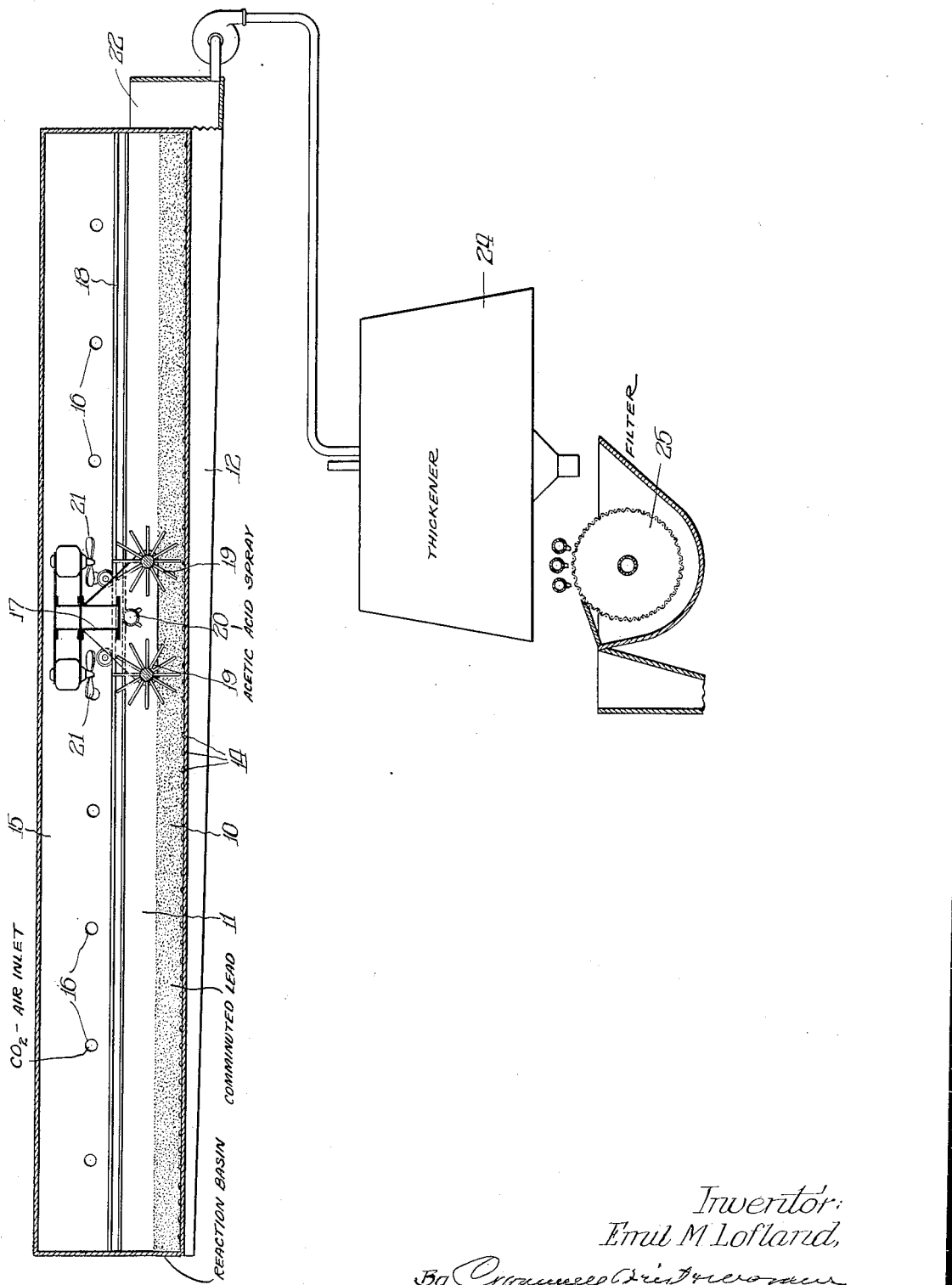
Inventor:
Emil M Lofland,
By Cromwell ...
Attys Patented June 20, 1933

1,914,952

UNITED STATES PATENT OFFICE

EMIL M. LOFLAND, OF CHICAGO, ILLINOIS

PRODUCTION OF WHITE LEAD

Application filed March 8, 1930. Serial No. 434,200.

This invention relates to the commercial production of lead carbonate suitable for use as a paint pigment or the like, and customarily known as white lead.

A general object of the invention is the provision of a method for quantity production of basic lead carbonate, or white lead, having all of the qualities and characteristics desirable in the use of such material as a pigment.

Another object of the invention is the provision of a method and apparatus whereby such compound can be produced under commercial operation in large quantities and in uniform quality at low cost, and with a desired certainty as to the quantity of output from a given quantity of raw material.

A particular object of the present invention is the provision of a method whereby a product of high specific gravity may be obtained.

Other and further objects will be pointed out or indicated hereinafter or will be apparent to one skilled in the art upon an understanding of the invention or its employment in practice.

In the accompanying drawing forming a part of this specification I show in diagrammatic fashion a certain type of apparatus which may be employed in the practice of the process, but it is to be understood that this is presented entirely for the purpose of illustration and aid in disclosing the invention, and is not to be construed in any fashion calculated to limit the appended claims short of the true and most comprehensive scope of the invention in the art.

In said drawing, the figure is a schematic illustration of apparatus, in the nature of a flow sheet, parts being illustrated in sectional elevation and parts in elevation.

The invention contemplates the subjection of metallic lead, in comminuted form, to oxidation and carbonation under conditions conducive to the rapid and complete conversion of the metal to a basic carbonate. A procedure whereby this conversion of the metal is accomplished with the desired rapidity and uniformity includes the disposal of the finely comminuted metallic lead in the form of a bed, which may be of any desired area, and is of such thickness and density as to allow its being thoroughly permeated by air, wetting the metal in the bed at intervals with an aqueous solution of acetic acid, reacting the wetted metal with oxygen and carbon dioxide and subjecting the bed to repeated agitation or energetic stirring whereby the metal in the bed is kept in a loose and fine condition and maximum surface exposure of the particles maintained and surface portions which have been converted to compounds are scoured off. Portions thus scoured off are retained in the bed, and tend to settle to the bottom, where they are retained still subject to action of the carbon dioxide until they are converted to a basic lead carbonate. When all of the metal in the bed, or a desired proportion thereof, has thus been converted, the basic lead carbonate is removed from the bed, recovered, washed, and dried if desired, and constitutes the commercial end product.

The procedure will be understood in more detail by consideration of a specific example which will be explained by reference to the accompanying drawing. Metallic lead is reduced to comminuted form in any suitable fashion, such as by atomizing, the particles preferably being of uniform size and as small as practicable. The comminuted metal is distributed in the form of a relatively shallow bed 10 in a reaction basin 11, the metal being loosely distributed so that the bed is readily permeable by air. The basin has a sloping bottom inclined toward a launder 12 into which liquid and fine suspended material may be discharged from the basin through the small screened openings 14. The basin is covered by a casing or housing 15, which is suitably tight to confine the carbon dioxide which is introduced through inlets 16. Mounted to travel back and forth over the basin is a carriage 17, which runs on suitable track rails 18 at the sides of the basin and is equipped with appropriate motive mechanism for accomplishing its travel. On this carriage are carried rotary agitators 19 which have stirring members adapted to sweep through the depth of the bed when the agitators are rotated by appropriate actuating means. The agitators are so rotated incident to the back-and-forth travel of the carriage, and by their action the entire bed may be energetically stirred, a part at a time in the course of the movement of the carriage. After the bed has been arranged in the basin, the carriage is moved thereover as described and the metal in the bed is wetted with an aqueous solution of acetic acid, the proportion of which may be between 2 and 20% by weight. Said solution is showered onto the bed from a distributor or spray pipe 20 carried on the carriage and supplied with the solution by a pump or in other appropriate fashion. Any excess of the solution, which does not adhere to the surfaces of the lead particles, is drained off in the launder 12 and returned for re-use. After being thus wetted, the particles are permitted to lie quiet for a suitable period, the wetted metal being exposed to the oxygen in the air which permeates the bed, and also to the action of carbon dioxide which is introduced into the casing 15 along with the air in a proportion of from 5 to 20% by weight. Under the action of the acetic solution and the oxygen in the air, surface portions of the metallic particles wetted with the solution are converted to a lead oxide and to a lead acetate, and under the action of the carbon dioxide, portions of the latter are more or less carbonated. When the metal has thus been exposed to these reactions for a period appropriate to permit the conversion of surface portions of the metal to these compounds, the carriage is again passed over the basin and the agitators actuated to stir the bed energetically. This has two important effects. In the first place, it thoroughly breaks up the bed, overcoming any agglomeration of the metallic particles, and in the second place, it scours off the surface portions of the particles which have been converted to the lead compounds. The breaking up of the bed in this fashion preserves its porosity and permeability to the gases and the surface exposure of the particles thereto, and the scouring off of the converted surface portions of the particles permits the detached compound to settle, in its relatively fine condition, to the bottom of the bed, and leaves the surfaces of the metallic particles again exposed. During the reaction, heat is generated, and it is desirable that the bed be maintained at a suitably elevated temperature to promote a resumption and rapid continuation of the reaction of the metallic lead with the air and carbon dioxide. Part of the heat is preserved in and in contact with the bed by the covering housing 15, and heat also may be contributed by the use of suitably cleaned flue gases from coke burning furnaces to supply the carbon dioxide which is introduced into the casing.

Coincidentally with this stirring of the bed occasioned by the traversing of the carriage, the lead particles are again wetted with the acidified solution sprayed from the distributor 20. The quantity of solution used in such spraying should be so controlled as not to unduly cool the metal, or wet it to the point where it will tend to agglomerate or ball up. In such rewettings of the bed, the quantity of solution used and also the proportion of acid in the solution may be reduced from that employed at the start or in the earlier wettings. Also, incident to the travel of the carriage, the air and carbon dioxide may be blown into the bed, as by means of fans 21 carried on the carriage, thus to accomplish the displacement of inert gases from the bed and promote contact of the gases with the wetted particles. After an effective reaction temperature has been once obtained, the period of exposure of the bed between stirrings may be reduced. I have found that if an average temperature of 100° F. is maintained in the bed, a satisfactory production may be obtained. These periodic stirrings and wetting during exposure of the bed to oxygen and $CO_2$ are repeated at suitable intervals until a suitable quantity of the metallic lead is converted and detached and the detached compounds carbonated to the desired degree. This procedure may be carried on until all the metallic lead in the basin is converted, or it may be stopped short of that point. At such time, the accumulated basic carbonate of lead in the basin is flushed out to the sump 22, whence it is taken to a thickener 24 and from this to a filter 25. In the filter it may be washed with water to remove traces of acidity, and from the filter the washed basic carbonate may be taken to a suitable drier to be dried to the desired merchantable form.

The procedure may be modified by starting with lead oxide, which is disposed in the bed in comminuted form, and wetted and agitated periodically as above described, while exposed to reaction with $CO_2$ and air, until converted to the basic carbonate of lead.

By procedures above described, large quantities of metallic lead may be converted to a basic lead carbonate with rapidity and uniformity, the end product having the covering power and other characteristics desirable in a white lead pigment, and being also of high specific gravity.

The present application is a continuation in part of my copending application Serial No. 417,971, and various features of the apparatus herein described are claimed in my copending applications Serial Nos. 283,607 and 273,838.

What I claim is:

1. A method of producing white lead which comprises disposing comminuted metallic lead in a bed pervious to air, wetting the particles in the bed, subjecting the wetted particles to reaction with oxygen and carbon dioxide, periodically agitating the bed, a localized portion at a time while the remainder remains at rest, to maintain the bed in a loose and porous condition and detach converted surface portions of the particles, wetting the localized portions of the bed while they are being agitated, retaining the detached and converted portions in the bed subject to the action of carbon dioxide, until they are converted to a basic lead carbonate, and then removing the lead carbonate from the reaction zone.

2. A method as specified in claim 1 and wherein the lead particles are maintained at an elevated temperature effective to promote the reactions.

3. A method as specified in claim 1 and wherein air and carbon dioxide are blown into the bed.

4. A method as specified in claim 1 and wherein the later wettings of the bed are less copious than the earlier wettings.

5. A method as specified in claim 1 and wherein the particles are wetted periodically with an acetic acid solution, the strength of the solution used for the later wettings being less than for the earlier.

6. A method of producing white lead which comprises exposing lead oxide in comminuted form in a bed pervious to air, wetting the oxide periodically, reacting the wetted oxide with carbon dioxide to an extent where the oxide is converted to a basic lead carbonate, and agitating the bed periodically, a localized portion at a time while the remainder is at rest, to maintain it in a condition pervious to the carbon dioxide and preserve surface exposure of the particles, and periodically wetting the localized portions of the bed while they are undergoing agitation.

In testimony whereof I have hereunto subscribed my name.

EMIL M. LOFLAND.

CERTIFICATE OF CORRECTION.

Patent No. 1,914,952.  June 20, 1933.

EMIL M. LOFLAND.

It is hereby certified that error appears in the printed specification of the above numbered patent requiring correction as follows: Page 2, line 89, after "obtained" insert the words "by stirring the bed at intervals of one hour"; and that the said Letters Patent should be read with this correction therein that the same may conform to the record of the case in the Patent Office.

Signed and sealed this 22nd day of August, A. D. 1933.

M. J. Moore.
Acting Commissioner of Patents.

(Seal)